United States Patent Office 2,850,957
Patented Sept. 9, 1958

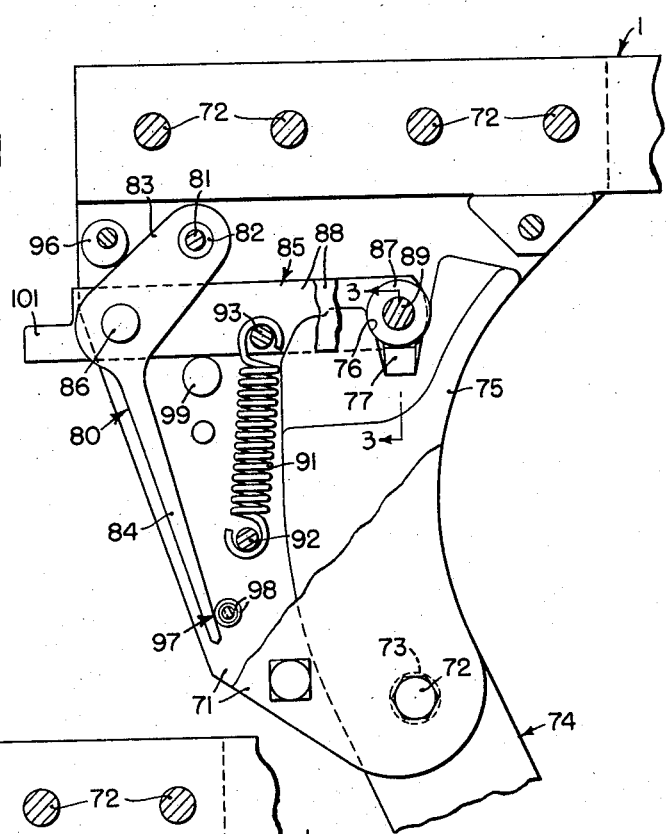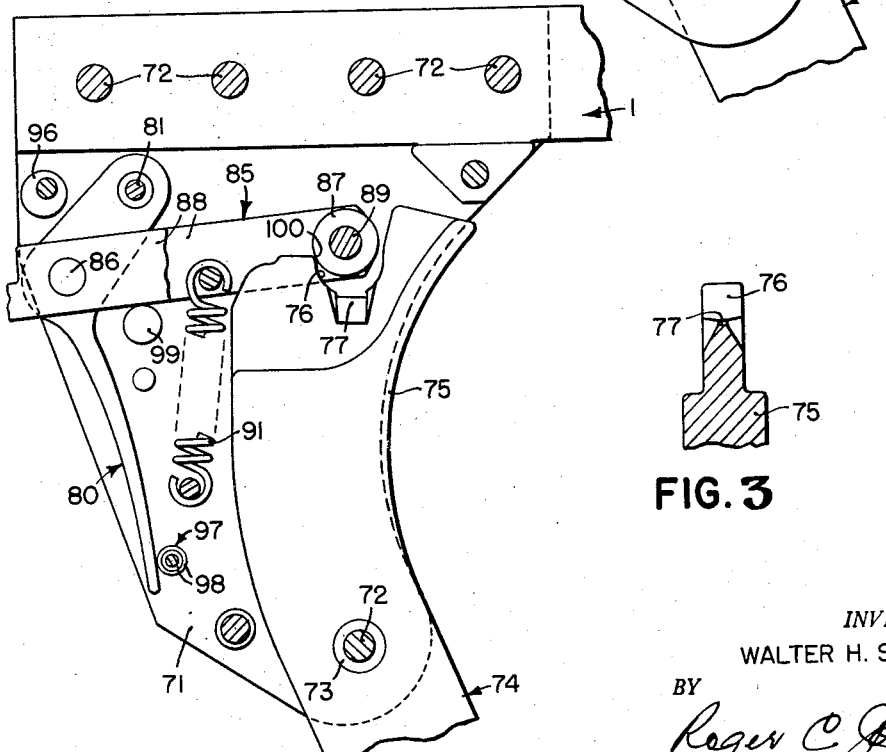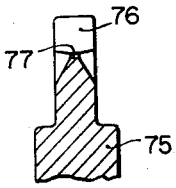

2,850,957

RELEASABLE PLOW STANDARD

Walter H. Silver, Moline, Ill., assignor to Deere & Company, Moline, Ill., a corporation of Illinois Application August 28, 1953, Serial No. 377,110

3 Claims. (Cl. 97—47.89)

This application is a continuation-in-part of my copending application Serial No. 316,147, filed October 22, 1952, now U. S. Patent No. 2,775,182, for Releasable Plow Standard.

The present invention relates generally to agricultural implements, and more particularly to ground-working implements such as plows and the like having ground-working tool means operating below the surface of the ground, which tool means may be damaged by continued forward travel of the implement after one or more of the tool means encounters an obstruction, such as a large stone or boulder, stump, root or the like.

The object and general nature of the present invention is the provision of an agricultural machine of the ground-working type, such as a plow or the like, having overload release means so constructed and arranged that the ground-working tool is automatically released upon the occurrence of an overload of substantial magnitude. Heretofore, overload release devices have been constructed on what might be termed the toggle link principle; that is, a mechanism equivalent to a toggle link arranged almost but not quite in a straight-line position, with the load-resisting means operating against the toggle joint at a mechanical advantage that is very great so long as the toggle linkage remains in its almost straight-line position. However, upon the occurrence of an overload of such magnitude that the toggle links begin to move toward their broken position, the mechanical advantage just mentioned rapidly decreases, providing thereby an overload release. Experience has shown, however, that overload releases of this type do not always release at the same amount of overload. This is thought to be due to variations in the frictional resistance in the toggle joint and other factors, such as accumulations of dirt, dust, rust and the like at the toggle joint. Such variations, although per se relatively small, result in wide variations in the magnitude of the overload required to effect a release of the tool, because of the large multiplication of the effect of joint friction variations by the above-mentioned mechanical advantage present when the toggle linkage is in its almost straight-line position.

Specifically, therefore, it is an object of the present invention to provide an overload release mechanism which is so constructed and arranged that the reaction of the tool is taken substantially directly against a resisting force, such as a relatively heavy spring or the like, with substantially no mechanical advantage, with a simple but complete disconnection of the transmission of the tool reaction to the opposing spring means upon the initial occurrence of a movement of the force-resisting means. While such disconnecting means may, like the toggle joint mentioned above, be subjected to certain variations, due to dust, dirt and other factors, the presence of such variations in the disconnecting action does not to any appreciable extent affect the responsiveness of the relatively heavy force-opposing spring or the like. This is because the tool reaction is applied directly to the spring with no magnification of the variations in the releasing means.

In the preferred form of the invention the yielding of the force-opposing means, as under overload conditions, serves to effect a disconnection of the force-transmitting means between the tool and the force-opposing means, by a simple movement of one part relative to the other in a direction generally transversely of the direction of the line of action of the tool-reacting force, thereby serving to directly lift one part out of connection with the tool-carrying means. In one form of the present invention such releasing means may comprise an abutment extension on the swingable part of the force-resisting means, which extension is adapted to lift a force-transmitting link directly upwardly out of connection with the tool standard. In another form of the invention, the arm that forms a part of the spring-biased, force-resisting means may be so pivotally connected with the associated force-transmitting link that, during the yielding of the pivoted arm, the linkage moves against a fixed abutment and thereby positively rocks out of interconnection with the tool-carrying standard or other means.

These and other objects and advantages of the present invention will be apparent to those skilled in the art after a consideration of the following detailed description, taken in conjunction with the accompanying drawings.

In the drawings:

Fig. 1 is a side view, with parts broken away, of a safety trip mechanism incorporating the principles of this invention, showing the parts in their normal operating position.

Fig. 2 is a view similar to Fig. 1 showing the parts in the positions they occupy substantially at the moment of release, as under overload.

Fig. 3 is a detail view, being a section taken generally along the line 3—3 of Fig. 1.

Referring first to Fig. 1, the present invention has been shown as incorporated in a plow of the tractor-carried type, in which the tractor carries suitable hitch means for receiving a plow frame 1 to which the plow bottoms are rigidly connected. The plow frame 1 is provided with a pair of brackets 71 connected, as by bolts 72, to the rear ends of the bars making up the plow frame 1, the brackets 71 extending downwardly in depending relation and apertured at their lower ends to receive an interconnecting pivot bolt 72 about which a bushing 73 is disposed. A plow standard 74, substantially like those described in the above mentioned parent application, is pivotally mounted on the bushing 73 between the bracket plates 71 and has at its upper end, as at 75, a roller-receiving notch 76. The bottom of the notch is of special construction, shown in Fig. 3, which includes a knife edge portion indicated generally at 77. The purpose of this particular construction is to prevent rust, dirt and the like from building up in the bottom of the notch 76.

Force-resisting resilient means, preferably in the form of a spring arm 80, is pivotally mounted on a pin 81, as through a bushing 82, carried by the bracket plates 71. The arm 80 includes an upper angularly disposed section 83 and a lower spring section 84, and a force-transmitting link member 85 is pivotally connected, as at 86, to the spring arm 80 and at its forward end carries a notch-entering roller 87. Preferably, the link member 85 is made up of two strap members 88, the pin or pivot 86 and a pin or pivot 89, receiving the roller 87, serving to hold the straps 88 together. A spring 91 is connected at its lower end to a stud 92 fixed to one of the bracket plates 71, and the upper end of this spring 91 is hooked over a pin 93 carried by the straps 88. The spring 91 is fairly light and serves to insure the seating of the roller 87 in the notch 76.

The spring arm 80 is held in the proper position relative to the bracket plates 71 by an upper eccentric abutment 96 and a lower abutment structure 97, preferably in the form of a plurality of tubular shims 98. When the parts are properly adjusted, as when adding or subtracting one or more of the shims 98, and by turning the eccentric 96 to the proper position, the spring arm 80 is accurately maintained in the proper position so as to dispose the pivot 86 so that the roller 87 freely enters the notch 76 when the tool standard is in its normal operating position, the relatively light spring 91 serving to maintain the roller 87 in the notch 76. As best shown in Fig. 1, when the parts are in their normal position, the lower edge of the link 85 lies substantially in contact with a fixed abutment 99 that is carried by the bracket plates 71. The abutment 99 is so positioned, relative to the link 85 and to the pivots 81 and 86, that, when the member 80 yields, as under an overload, the pivot 86 moves downwardly, generally toward the abutment 99 and this causes the link 85 to rock about the abutment 99 as a fulcrum thus positively lifting the roller 87 out of the notch 76. Fig. 2 illustrates the positions of the several parts substantially at the moment of release. In this connection, it will be noted that in the normal position of the parts the roller 87 lies well within the notch 76 so that normal draft forces are transmitted directly from the upper end of the standard 75 through the roller 87 to the link 85, and from the latter to the spring arm 80. Since the widest part, or diameter, of the roller 87 lies below the upper edge of the notch 76, there is no tendency for the forces transmitted to lift the roller 87 out of the notch 76. However, when the spring member begins to yield, as indicated in Fig. 2, the member swings in a counterclockwise direction about the pivot 81, and this moves the rear end of the link 85 downwardly, rocking the same about the fulcrum abutment 99 and lifting the roller 87 upwardly. As soon as the diameter of the roller passes upwardly above the uppermost rear edge, indicated at 100 in Fig. 2, of the notch 76, the transmitted force then immediately swings the link 85 upwardly against the relatively light spring 91 and thus immediately effecting a disconnection of the link 85 from the tool standard 75. However, due to the positive action of the arm 80 rocking about its pivot 81 and fulcruming the link 85 upwardly, the release of the link from the tool standard is not materially affected by any irregularities, such as due to the presence of dirt, rust and the like, at the edge 100 of the notch 76.

The link 85 includes a rear extension 101, which may be used to manually disconnect the link 85 from the standard 74, when the latter is not under load, the spring 91 being sufficiently light to permit this action with relative ease.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. In a ground working means, a beam, a depending bracket fixed at its upper portion to said beam, a tool standard pivoted to the lower portion of said bracket and including an upwardly extending portion lying above the pivot connection between said standard and said bracket, a spring arm disposed generally rearwardly of the upwardly extending standard portion and pivotally connected at its upper end with said bracket adjacent the upper portion thereof, said arm including a portion extending downwardly and rearwardly from its pivotal connection with said bracket and a spring portion extending downwardly and forwardly from the lower part of said first mentioned arm portion, anchoring means receiving the lower end of said lower arm portion, said anchoring means being carried by said bracket, a link pivotally connected at its rear end with said arm adjacent the juncture of said upper and lower arms portions, said link extending forwardly and having a releasable connection with the upper portion of said tool standard, a stationary abutment carried by said bracket and located forwardly and downwardly of the pivot connection between said link and said arm, said link substantially engaging said abutment when said link is engaged with said tool standard, said abutment being located so that when, as when an overload is imposed on the lower portion of said standard, the pivotal connection between said link and said arm moves generally downwardly and forwardly relative to said abutment, said movement of the rear portion of said link acts to rock the latter about said abutment and release said link from said standard.

2. The invention set forth in claim 1, further characterized by spring means being disposed generally vertically in front of said abutment means and rearwardly of the upper portion of said tool standard, means connecting the upper portion of said spring means with said link, and means connecting the lower portion of said last-mentioned spring means with said bracket.

3. In a ground working means, a beam, a depending bracket fixed at its upper portion to said beam, a tool standard pivoted to the lower portion of said bracket and including an upwardly extending portion lying above the pivot connection between said standard and said bracket, a spring arm disposed generally rearwardly of the upwardly extending standard portion and pivotally connected at its upper end with said bracket adjacent the upper portion thereof, said arm including a portion extending downwardly and rearwardly from its pivotal connection with said bracket and a spring portion extending generally downwardly from the lower part of said first mentioned arm portion, anchoring means receiving the lower part of said lower arm portion, said anchoring means being carried by said bracket, a link pivotally connected at its rear end with said arm adjacent the juncture of said upper and lower arm portions, said link extending forwardly and having a releasable connection with the upper portion of said tool standard, a stationary abutment carried by said bracket and located forwardly and downwardly of the pivot connection between said link and said arm, said link substantially engaging said abutment when said link is engaged with said tool standard, said abutment being located so that when, as when an overload is imposed on the lower portion of said standard, the pivotal connection between said link and said arm moves generally downwardly and forwardly relative to said abutment, said movement of the rear portion of said link acts to rock the latter about said abutment and release said link from said standard.

References Cited in the file of this patent

UNITED STATES PATENTS

| Number | Name | Date |
|---|---|---|
| 372,206 | Damerill | Oct. 25, 1887 |
| 545,987 | Van Brunt | Sept. 10, 1895 |
| 1,078,871 | Olson | Nov. 18, 1913 |
| 1,253,961 | Grimsrud | Jan. 15, 1918 |
| 1,808,477 | Printz | June 2, 1931 |
| 1,808,478 | Printz | June 2, 1931 |
| 2,756,659 | Lindeman | July 31, 1956 |

FOREIGN PATENTS

| Number | Country | Date |
|---|---|---|
| 90,883 | Sweden | Nov. 23, 1937 |
| 639,151 | Great Britain | June 21, 1950 |